United States Patent [19]
Jaramillo et al.

[11] Patent Number: 5,253,511
[45] Date of Patent: Oct. 19, 1993

[54] TRANSMITTER WITH MULTIFUNCTION ADJUSTMENT

[75] Inventors: Rafael Jaramillo, Minnetonka; Roger L. Frick, Chanhassen; Kären B. Carlson, Eden Prairie; Randy K. Paschke, Chaska; Christopher M. Throne, Lakeville, all of Minn.

[73] Assignee: Rosemount Inc., Eden Prairie, Minn.

[21] Appl. No.: 888,263

[22] Filed: May 22, 1992

Related U.S. Application Data

[63] Continuation of Ser. No. 603,173, Oct. 25, 1990, abandoned.

[51] Int. Cl.⁵ .............................................. G01D 3/02
[52] U.S. Cl. ................................ 73/1 R; 340/870.04; 340/870.16; 364/571.04; 364/571.05
[58] Field of Search ................. 73/1 R, 866.1, 866.2; 324/98, 99 R, 79 D, 100; 340/870.04, 870.16, 870.17, 870.18; 341/176, 173; 318/592, 594; 364/571.01–571.08

[56] References Cited

U.S. PATENT DOCUMENTS

| | | | |
|---|---|---|---|
| 3,378,741 | 4/1968 | Sutton | 318/594 |
| 3,513,371 | 5/1970 | Hoppe | 318/594 |
| 3,544,970 | 12/1970 | Weinbaum | 340/870.04 X |
| 4,221,004 | 9/1980 | Combs et al. | 73/290 V X |
| 4,353,019 | 10/1982 | Sweeney, Jr. | 318/594 |
| 4,549,173 | 10/1985 | Nakamura | 340/726 |
| 4,549,180 | 10/1985 | Masuda | 340/870.04 |
| 4,651,147 | 3/1987 | Wennersten et al. | 340/802 |
| 4,748,852 | 6/1988 | Frick | 73/718 |
| 4,782,285 | 11/1988 | Bristol et al. | 324/98 |
| 4,783,659 | 11/1988 | Frick | 340/870.37 |
| 4,922,856 | 5/1990 | Sweeney, Jr. | 119/51.04 |

FOREIGN PATENT DOCUMENTS

| | | | |
|---|---|---|---|
| 1169692 | 5/1964 | Fed. Rep. of Germany | 73/1 R |
| 3500839 | 7/1986 | Fed. Rep. of Germany | 73/1 R |
| 91514 | 3/1990 | Japan | 73/1 R |

OTHER PUBLICATIONS

TEK Operators Manual for Tektronix 2430A Digital Oscilloscope pp. 5-12, 5-13, FIG. 9-6, and FIG. 9-7 published by Dec. 1990.

*Primary Examiner*—Tom Noland
*Attorney, Agent, or Firm*—Kinney & Lange

[57] ABSTRACT

A process variable transmitter which has a manual adjustment for span and zero or the like. The adjustment has a finer adjustment range where the output changes responsive to changes in the position of the adjustment. The adjustment has a coarse range where the transmitter output changes automatically as a function of time to provide coarser adjustment. An operator can move the back and forth between the adjustment ranges until a desired output value is observed. When adjustment is complete, the operator can manually select the desired transmitter output value and then a selection circuit stores the setting in non-volatile memory. After a setting is stored, the transmitter output is not sensitive to movement of the manual adjustment, but is instead controlled by the stored setting.

41 Claims, 4 Drawing Sheets

TRANSMITTER WITH MULTIFUNCTION ADJUSTMENT

This is a continuation of U.S. patent application Ser. No. 07/603,173 filed on Oct. 25, 1990, abandoned as of the date of this application.

BACKGROUND OF THE INVENTION

This invention relates to process variable transmitters having manually adjustable output parameters such as span, zero, or upper and lower range values.

SUMMARY OF THE INVENTION

The present invention relates to a process variable transmitter which has manually adjustable settings, such as span and zero or upper and lower range values of the transmitter's output. Each manual adjustment can be set to a fine range where the transmitter output responds to changes in the manual adjustment itself to provide a fine adjustment of the transmitter output. The manual adjustment can then be set to a coarse range where the transmitter output changes automatically as a function of time to provide coarse adjustment. An operator can move the manual adjustment back and forth between the fine and coarse ranges until a desired transmitter output value is observed. When adjustment is thus complete, the operator can manually select the desired transmitter output value and then selection means in the transmitter provide a storage command to nonvolatile storage means in the transmitter to store the setting. After a setting is stored, the transmitter output is not sensitive to movement of the manual adjustment, but is instead controlled by the stored setting.

Shock and vibration applied to the transmitter can move the adjustment setting, but do not affect the adjustment of the transmitter output once the settings are stored. The settings are not lost when energization is removed from the transmitter because the settings are stored in non-volatile memory.

DETAILED DESCRIPTION OF THE PREFERRED EMBODIMENTS

Figure 1:
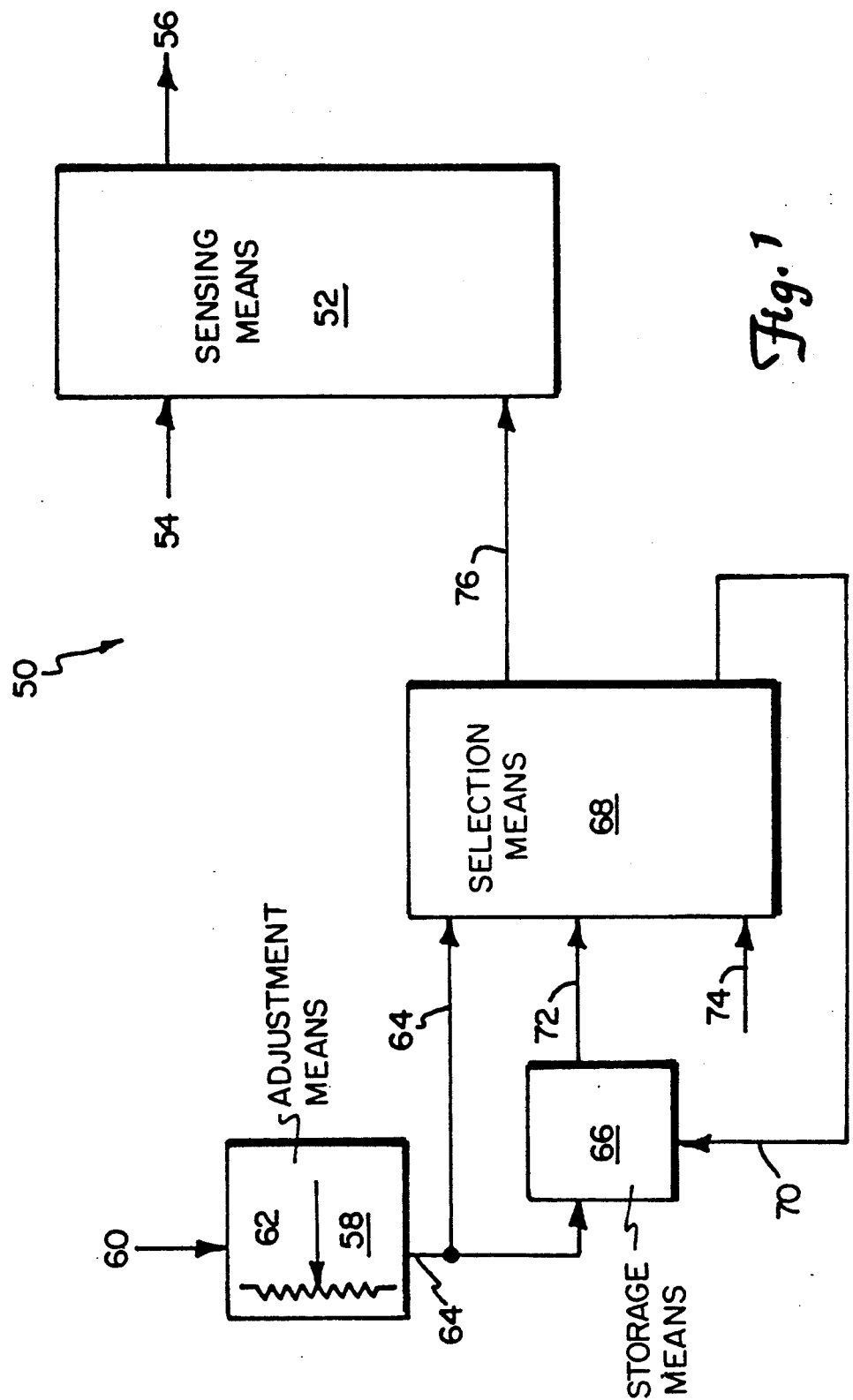
FIG. 1 is a block diagram of a first embodiment of a transmitter according to the invention.

In FIG. 1, a first embodiment of transmitter 50 includes sensing means 52 which sense process variable 54, such as pressure, temperature, flow, pH or the like. Sensing means 52 preferably includes a sensor and uses a microcomputer to control transmitter output 56 to represent sensed process variable 54. Transmitter output 56 preferably couples to a 4–20 mA current loop which energizes the transmitter, and transmitter output 56 controls the magnitude of the loop current to indicate the value of the process variable.

Transmitter 50 can be adapted to a variety of applications with differing requirements to adjust upper (20 mA) and lower (4 mA) values of the transmitter output to process variables. In one exemplary application, transmitter 50 is a pressure transmitter and has a 20 mA output when the pressure is 100 PSI and a 4 mA output when the pressure is 0 PSI. In another exemplary application, the same pressure transmitter 50 is required to have a 20 mA output when the pressure is 50 PSI and a 4 mA output when the pressure is 30 psi. A manual adjustment of upper and lower range values of the output, or alternatively span and zero, is thus desired to adjust the transmitter to each application. Likewise for other process variables and other types of transmitter outputs, there is a desire for manual adjustment locally at the transmitter.

In FIG. 1, adjustment means 58 receives manual adjustment 60 applied to potentiometer 62 or other manual input device such as an optical encoder. Adjustment means 58 converts manual adjustment 60 to adjusted electrical output 64. Manual adjustment 60 is divided into two ranges. In a fine range of manual adjustment, adjusted electrical output 64 varies responsive to changes in the position of manual adjustment 60 itself. This fine range provides for fine adjustment and is typically the middle range of travel of potentiometer 62 or other manual input device. In a coarse range of manual adjustment, adjusted electrical output 64 varies as function of time. The coarse range is typically near two ends of travel of potentiometer 62 or other manual input device. In one embodiment, the adjusted electrical output increases with time near one end of travel of the potentiometer, and decreases with time near the other end of travel of the potentiometer. Various other arrangements of the coarse range of adjustment, that is adjustment as a function of time, can be used. There can be a single coarse range in which the adjusted electrical output 64 alternately varies up and down in a sawtooth pattern over the range of available transmitter output settings. Speed of coarse adjustment with time can be fixed, made a function of the manual adjustment, or the speed can be a function of the length of time that the adjustment is left in the coarse range, as desired.

Adjustment means 58 preferably includes a potentiometer 62 and an analog-to-digital converter to provide adjusted electrical output 64 as a digital word to a microcomputer in transmitter 50. Adjustment with time in the coarse range is preferably controlled by a microcomputer, as well.

Adjusted electrical output 64 couples to storage means 66 and selection means 68 in transmitter 50. Storage means 66 comprises non-volatile memory, such as electrically erasable programmable read only memory (EEPROM), for storing one or more setting of adjusted electrical output 64 which correspond to span, zero, upper range value, lower range value settings, and the like. A value of adjusted electrical output 64 is stored for each selected adjustment when a corresponding STORE command 70 is applied to storage means 66. Storage means 66 provide a stored value 72 corresponding to each stored setting to selection means 68.

Selection means 68 receives adjusted electrical output 64 and also stored value 72 (which can include multiple settings for multiple adjustments, such as both upper and lower range settings of the transmitter output). Manual selection input 74, which can be a switch setting on the transmitter controlled by an operator, couples to selection means 68 to control selection of the application of adjusted electrical output 64 and stored value 72 to selected output 76. Manual selection input 74 has a STORE position and a position for each desired setting (e.g., upper and lower range values of the transmitter output). When the operator moves manual selection input 74 to select the "store" position, selection means 68 provides a STORE command to storage means 66 to store a stored value for the last setting selected at manual input 74. When manual selection input 74 rests in the store position, the output 76 comprises stored values of setting only, and does not comprise adjusted electrical output 64. When manual selection input 74 rests in the store position, the selected output 76 is independent of inadvertent actuation of potentiometer 62 by shock, vibration, or tampering. When manual selection input 74 is in a position to select a setting such as lower range value, for example, then the adjusted electrical output 64 is provided as that selected setting (lower range value) to selected output 76. Selected output 76 couples to sensing means 52 to provide setting for controlling conversion parameters of sensed process variable 54 to a value on output 56. Selection means 68 preferably is implemented in a microcomputer program.

Sensing means 52 computes transmitter output 56 according to a selected equation which is a function of sensed process variable 54 and parameter settings received from selected output 76. Typically, the conversion equation is simply a straight line, or linear equation relating transmitter output 56 to sensed process variable 54 with scale factor and offset controlled by selected output 76. Other relationships between the transmitter output and the sensed process variable 54, such as a square root relationship can also be used.

Figure 2:
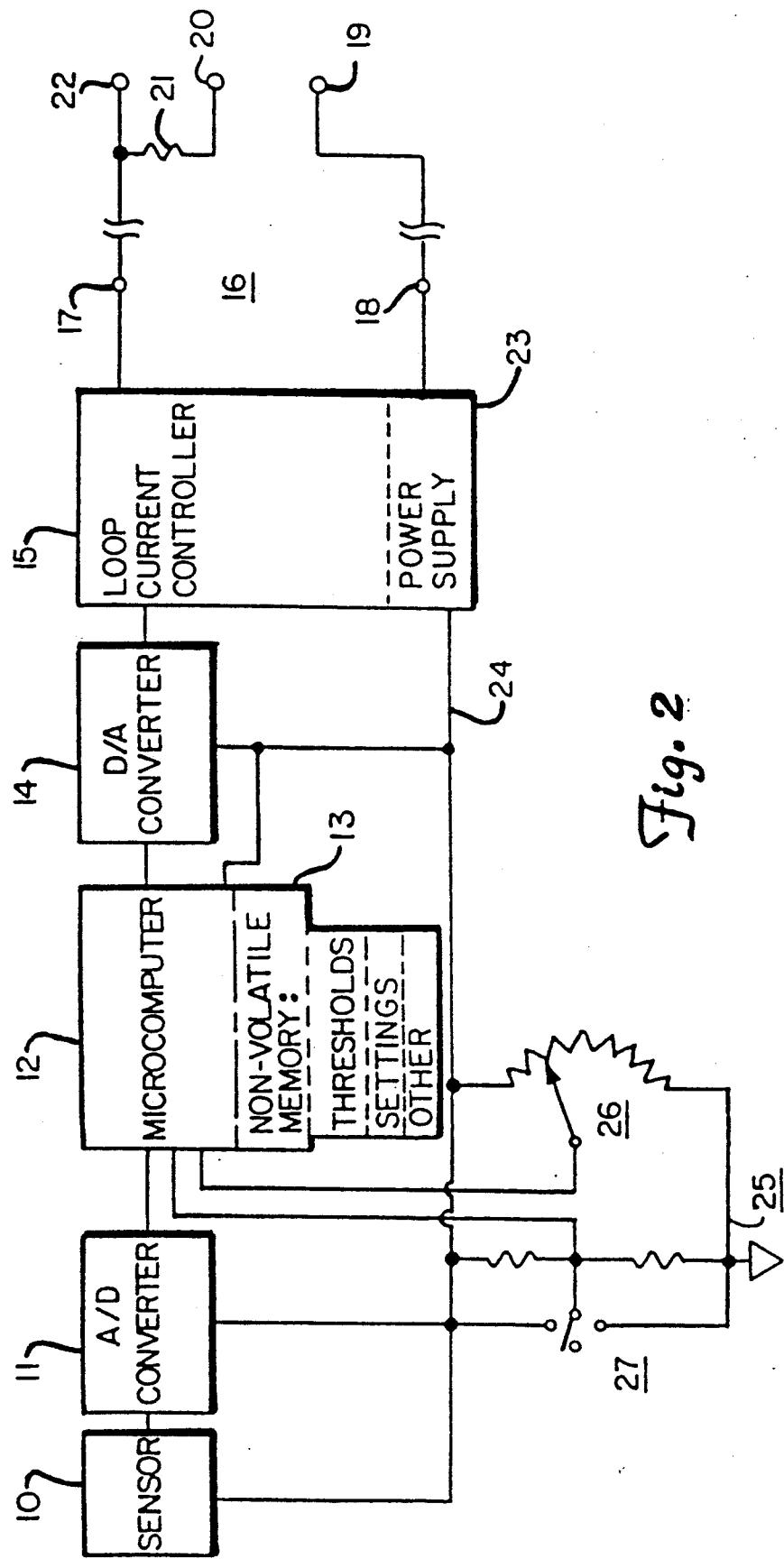
FIG. 2 is a block diagram of a second embodiment of a transmitter according to the invention.

In FIG. 2, a second embodiment of a transmitter according to the invention is shown. Sensor 10 senses a process variable such as pressure, temperature, flow, pH or the like. Sensor 10 generates an analog sensor output representative of the sensed process variable which couples to analog-to-digital (A/D) converter 11. A/D converter 11 converts the analog sensor output to a digital sensor output which couples to microcomputer 12. Microcomputer 12 includes nonvolatile memory 13 for storing adjustment settings and the like. Microcomputer 12 calculates a digital transmitter output as a function of the settings and the digital sensor output. The digital transmitter output couples to digital-to-analog (D/A) converter 14 which provides an analog transmitter control output to loop controller 15. Loop controller 15 connects to current loop 16 at terminals 17, 18 and controls current on loop 16 to have a magnitude representative of the sensed process variable. Loop 16 includes a resistor 21 and a DC power supply at terminals 19, 20 which are located remotely from the transmitter. A potential across resistor 21, that is between terminals 20, 22 is representative of the sensed process variable.

The loop power supply at terminals 19, 20 energizes loop current controller 15. Loop current controller 15, in turn, energizes power supply 23 in the loop current controller which provides energization to all transmitter circuitry on lines 24, 25.

In FIG. 2, potentiometer 26 receives manual adjustment from an operator and provides an analog voltage to microcomputer 12. Microcomputer 12 senses the analog voltage and generates an adjusted electrical output (a word which the microcomputer stores in random access memory, for example) which depends on the analog voltage being in a fine or coarse range of adjustment as determined by the microcomputer. If the analog voltage is in the fine range, the magnitude of the adjusted electrical output varies with the position of the manual adjustment itself received by the potentiometer 26. If the analog voltage is in a coarse range, the magnitude of the adjusted electrical output varies as a function of time. Preferably, the fine range is the middle part of adjustment of the potentiometer and the coarse range includes parts of the adjustment of the potentiometer near both ends of adjustment.

In a preferred embodiment, the potentiometer provides finer adjustment of the adjusted electrical output over its central portion, and coarser adjustment as a function of time near the ends of the potentiometer's travel. An operator can move the manual adjustment back and forth between the fine and coarse ranges until a desired transmitter output value is observed. When adjustment is complete, the operator can manually actuate switch circuit 27 to store the desired transmitter output value in nonvolatile memory 13 as a upper range value or lower range value setting as desired. Switch circuit 27 has three positions, one for setting upper range value (typically 20 mA of loop current), one for setting lower range value (typically 4 mA of loop current), and one for initiating a STORE command to the nonvolatile memory. When switch circuit 27 is in the "store" position, the transmitter upper and lower range value setting are not sensitive to movement of potentiometer 26 due to shock, vibration, and tampering.

In FIG. 2, microcomputer 12 performs several functions. The microcomputer provides adjustment means for adjusting an adjusted electrical output as a function of sensed potentiometer position to adjust the adjusted electrical output as either a function of time or position depending on the range in which the adjustment input is sensed. The microcomputer includes nonvolatile storage means 13 for storing a stored value of a setting when the STORE command is initiated by switch 27. The microcomputer includes selection means for selecting either a stored value or the adjusted electrical output depending on position of the switch circuit 27. The microcomputer 12 generates the STORE signal responsive to movement of switch circuit 27 to the store position. The microcomputer computes the output as a function of the sensed process variable and the settings provided by the operator through switch 27 and potentiometer 26.

Figure 3:
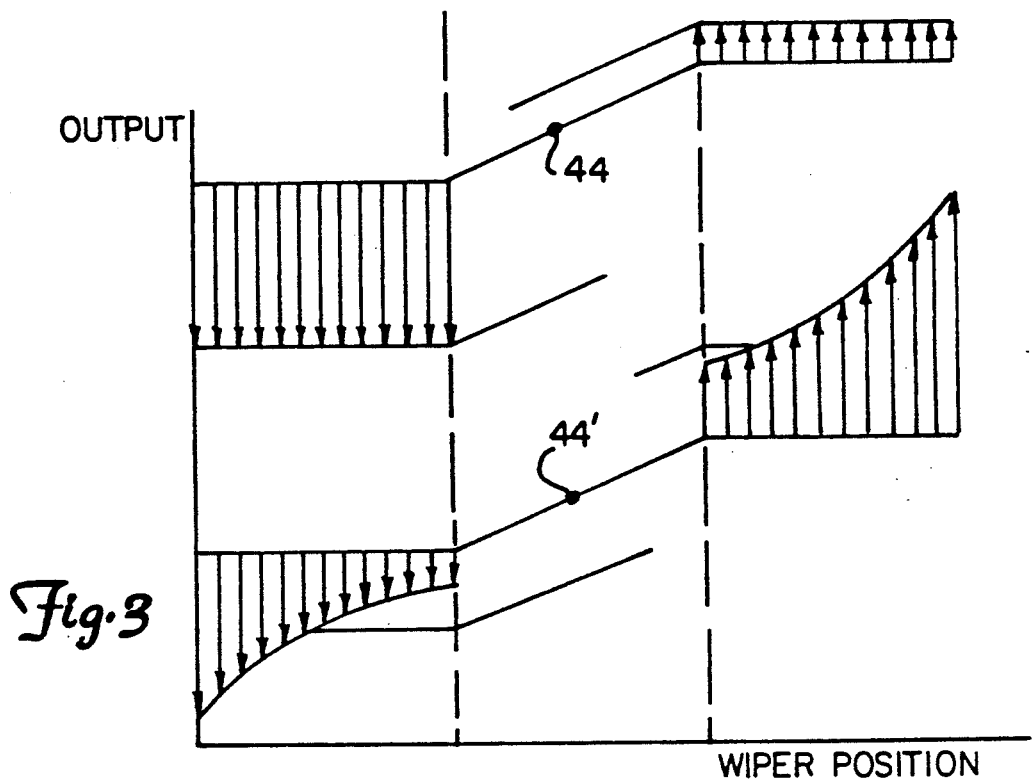
FIG. 3 illustrates an adjusted electrical output responding to manual movement and time with a time rate depending on wiper position.

In FIG. 3, adjusted electrical output 64 is illustrated responding to manual movement and time. An axis labeled "WIPER POSITION" represents mechanical position of a wiper of a potentiometer such as potentiometer 26 or 62. An axis labelled "OUTPUT" represents adjusted electrical output such as adjusted electrical output 64.

In FIG. 3 at 44 is a first illustration of response of the adjusted electrical output to an operator's movement of the potentiometer's wiper. In a central region of wiper travel, defined by dashed vertical lines, the output varies according to the wiper position itself. The variation in the central region shown at 44 is linear, however, more complex functions can be used as well. As the wiper is moved to the left of the central region, the output becomes less sensitive to wiper position as illustrated by the horizontal line. The output is dependent on time in that left region and the output decreases as a function of time as illustrated by the downward arrows. The arrows are all the same length illustrating that the time rate of change is substantially independent of wiper position. On the right side of the central region at 44 is another region of wiper position where the output increases with time at a fixed rated. The operator can thus cause large, coarse excursions of the output by simply leaving the wiper to the left or right of the central region. Once the output has moved close to the value desired by the operator, the operator can move the wiper to the central region to make fine adjustments. This arrangement allows the potentiometer's limited resolution to be confined to a relatively small but movable range. The result is availability of high resolution adjustment over the entire range of settings made available by the transmitter.

In FIG. 3 at 44', an alternate arrangement similar to that shown at 44 is illustrated, however, the magnitude of the time rate of change is adjusted by the wiper position. This allow the operator to move quickly to a desired general adjustment range, and then move the wiper to slow down the time rate of adjustment as the desired setting is approached, and then finally move smoothly into the central region to complete a fine adjustment before storing the adjustment.

Figure 4:
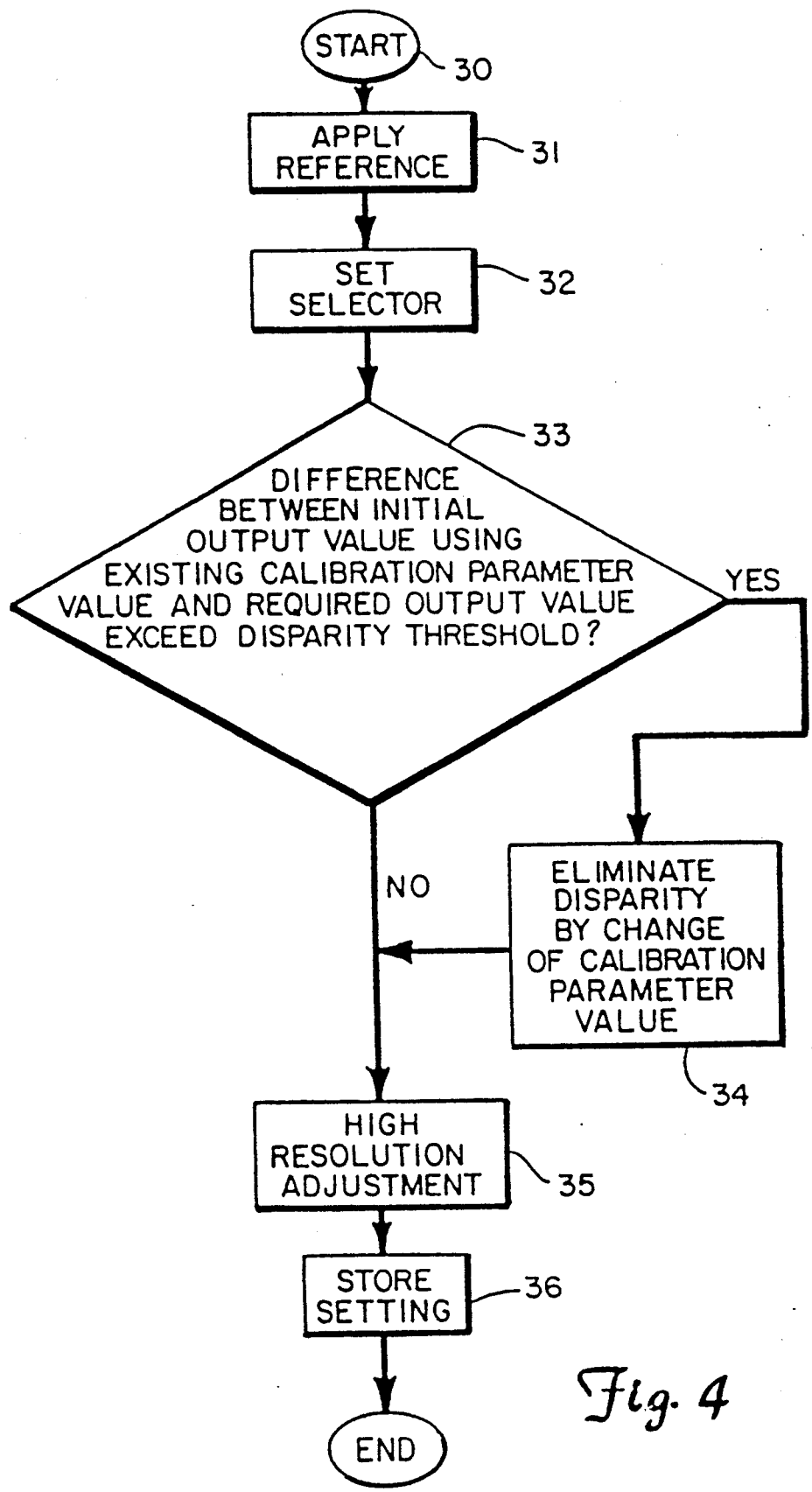
FIG. 4 is a flow chart illustrating operation of a transmitter when adjustment is selected by an operator.

Turning next to FIG. 4, one aspect of the time rate of adjustment illustrated in FIG. 3 is that the manual adjustment may be inadvertently left with the adjusted electrical output changing as a function of time for an extended interval of time. A transmitter's output cannot continue to increase or decrease indefinitely, and eventually reaches some upper or lower limit, e.g., current saturation such as 3.5 mA or 25 mA in 4 to 20 mA transmitter output. When this limit is reached by the transmitter's output, but exceeded by the adjusted electrical output, the transmitter's output does not respond immediately to further changes in the position of the wiper and the adjustment appears to the operator to be not operating. When the operator returns to make a desired adjustment, it can take an undesirably long wait to bring the output back to a desired setting. In a preferred embodiment illustrated in a flow chart, FIG. 4, the transmitter compares the adjusted electrical output to a stored value, and if there is such a large discrepancy or difference between the transmitter output and the adjusted electrical output, the adjusted electrical output is automatically reset to the stored value as an initial setting. This operation automatically restores transmitter output current to a non-saturated range where change can be observed by the operator. This avoids long delays in making adjustments.

In FIG. 4, the resetting operation is illustrated starting at 30 for an exemplary pressure transmitter. The operator first applies a reference, such a pressure corresponding to an upper range value to the pressure transmitter as shown at 31. The operator next sets the selector switch to upper range value as shown at 32. Setting the selector switch to upper range value is sensed by a microcomputer, and the microcomputer responds by performing the logical test shown at 33. At 33, a difference between the adjusted electrical output (initial output value) and the currently stored output value (stored value) is calculated. If the difference is less than a predetermined amount (disparity threshold), no resetting is done and calibration continues on as shown at 35. If, however, the difference exceeds the disparity threshold, then the adjusted electrical output (calibration parameter) is changed to near the current stored value as shown at 34. After the change shown at 34, calibration continues as shown at 35. At 35, the operator makes fine and coarse adjustments as previously described above. After adjustment is complete, the operator moves the selector switch to the "store" position as shown at 36 to store the new setting.

The procedure illustrated in FIG. 4 can be repeated for other setting as desired. In a further improvement, a time limit is placed on the length of time that the adjusted electrical output 64 can change as a function of time without the position of the adjustment changing. The time limit is typically a 15 minutes. If the operator does not move the adjustment during this time limit, then the transmitter automatically leaves the adjustment mode.

Figure 5:
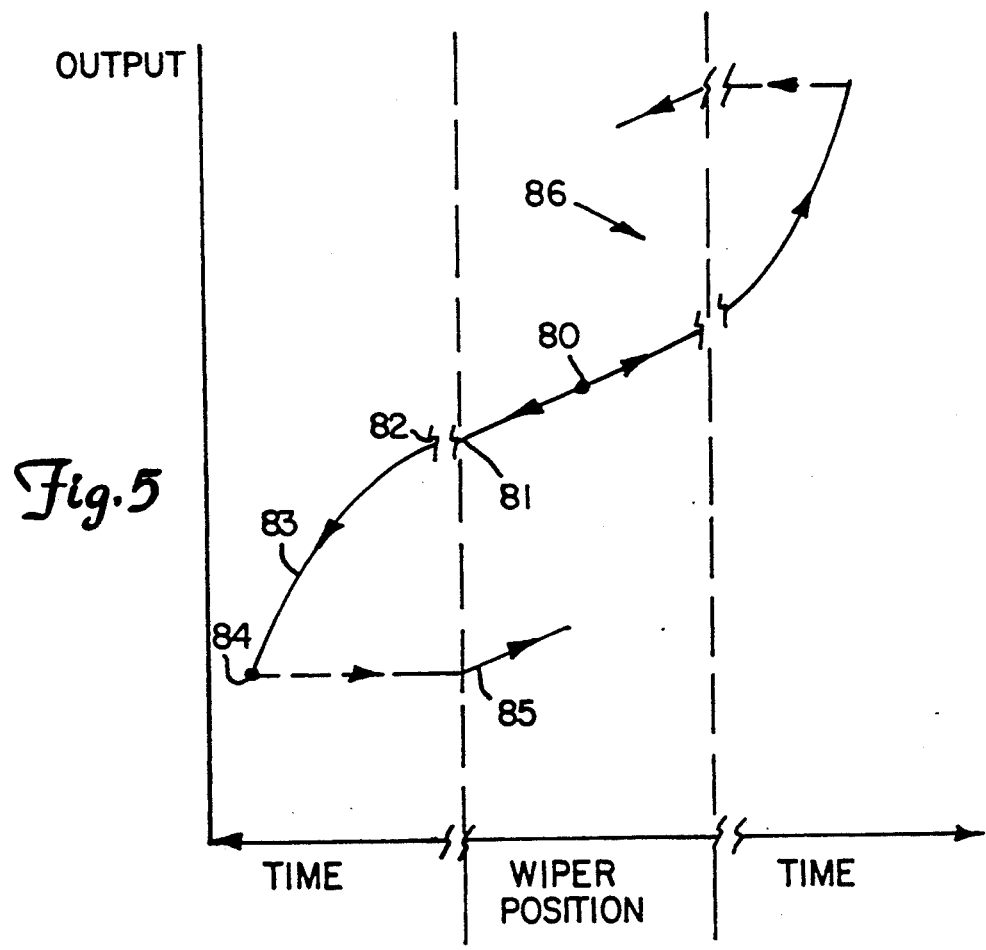
FIG. 5 illustrates an adjusted electrical output responding to manual movement and time with a time rate increasing exponentially with time.

In FIG. 5, adjusted electrical output 64 is illustrated responding to manual movement and time. A first axis labelled "OUTPUT" represents a value of adjusted electrical output 64. An axis labelled "WIPER POSITION" represents position of a wiper of a potentiometer in a central region of wiper travel. Axes labelled "TIME" on opposite sides of the WIPER POSITION axis illustrate the length of time intervals when the wiper position of the potentiometer is outside the central region. Adjusted electrical output 64 has an initial value 80 shown in FIG. 5 when the wiper is in the central region. As an operator moves the wiper to the left as illustrated at 81, the value of the adjusted electrical output decreases as a function of the wiper position. When the wiper continues to move left, the wiper leaves the central region, and the adjusted electrical output 64 then has a value shown at 82 in FIG. 5. The values of the adjusted electrical output 64 at 81 and 82 are substantially the same value, however, because the wiper is outside the central region at 82, the output changes exponentially as a function of the length of time that the adjustment is left outside the central region. The exponential change as a function of time of adjusted electrical output 64 is illustrated at 83 in FIG. 5. An operator allows the adjusted electrical output 64 to change exponentially with time until the adjusted electrical output 64 is near a desired value at 84, and then the operator moves the wiper back into the central region where the adjusted electrical output again becomes a function of position as illustrated at 85.

Alternatively in FIG. 5, the operator can move the wiper from 80 to the right to increase the output as illustrated generally at 86. The exponential change with time provides a coarse adjustment, and the adjustment with position provides a fine adjustment. The exponential function is merely exemplary, and other functions wherein the time rate of change of the adjusted electrical output 64 increases with the length of time that the wiper is outside of the central region can also be used.

Adjustments of transmitter outputs according to the present invention allows arbitrary selection of upper and lower transmitter output values. Rather than being limited to setting the output to 4 mA and 20 mA when lower and upper reference pressures are applied, the outputs can be set to other values arbitrarily within the operating limits of the transmitter. A lower value could be set at 8 mA and an upper value could be set at 12 mA, and the transmitter would then operate according to those settings over the entire 4–20 mA output range. The transmitter can thus be calibrated to operate over a selected range even when reference pressures are not available at the upper and lower limits of the range.

Adjustments of transmitter output parameter settings according to the present invention can be made to not interact with one another, regardless of which adjustment is done first. The adjustments adjust parameters in an equation stored in the microprocessor, and the equation calculates the transmitter output. A preferred method of noninteractive span and zero adjustment is represented by the following equation:

$$DACOUT = (NFN - SET4)2^{SHIFT} \times \frac{SPAN}{2^{SHIFT}} + MINVAL$$

where:

DACOUT represents the transmitter output;

NFN represents a linearized, filtered value of the sensed process variable;

SET4 represents a zero setting;

SPAN represents a span setting;

SHIFT represents an exponent adjusted to keep calculated values such as SPAN/$2^{shift}$ within a convenient calculation range of a microprocessor;

MINVAL represents an output value of the transmitter output at the last zero setting.

A preferred method of transmitter output adjustment can be performed using the above equation by providing a serial digital input to adjustment means 58 in FIG. 1. The serial digital input to adjustment means 58 adjusts the adjusted transmitter output 64 as a substitute for manual adjustment and setting. By using a calibration device which monitors transmitter output 56 and feeds back digital adjustments and settings to the serial digital input of adjustment means 58, the transmitter can be automatically re-ranged after initial calibration. As a first step in such automatic re-ranging, the calibration device provides a serial input to sensing means 52 to provide a substitute, simulated value of the process variable (NFN) to sensing means 52. While this substituted value is being provided, circuitry such as an application specific integrated circuit (ASIC) providing the actual pressure reading is disabled. The calibration device then senses the transmitter output and, if adjustment is needed, sends an adjustment output to the serial digital input of adjustment means 58 to increment or decrement the adjusted electrical output 64 as needed until the transmitter output as sensed by the calibration device is at a desired setting. The adjustment is then stored in EEPROM in the transmitter as described above. This process is then repeated for another transmitter setting so that both span and zero can be automatically set. After the re-ranging is complete, the ASIC is re-enabled so that the output again represents pressure.

Although the present invention has been described with reference to preferred embodiments, workers skilled in the art will recognize that changes may be made in form and detail without departing from the spirit and scope of the invention.

What is claimed is:

1. A transmitter, comprising:

manual adjustment means receiving a manual movement from an operator for providing both finer and coarser adjustments of an adjusted electrical output over fine and coarse ranges of the manual movement, the adjusted electrical output adjusting automatically in the coarse range with a time rate of change and adjusting manually in the fine range by changing according to the manual movement itself;

storage means for storing the adjusted electrical output in nonvolatile memory as a stored value when a store command is received;

selection means receiving manual selections from the operator, for selecting the adjusted electrical output after the operator selects a desired adjustment setting and for providing the store command and selecting the stored value after the operator selects a store setting; and circuit means sensing a process variable for controlling a transmitter output which represents the process variable and has a parameter controlled by the selection such that the parameter can be adjusted coarsely and finely and then made insensitive to adjustment by the storing.

2. The transmitter of claim 1 wherein the coarse range includes a first portion where the adjusted electrical output increases automatically with time and a second portion, different than the first portion, where the adjusted electrical output decreases automatically with time.

3. The transmitter of claim 2 wherein the circuit means provides a transmitter output limited to a transmitter output range and the fine range provides fine adjustment over a portion of the transmitter output range and the coarse range provides coarse placement of the fine adjustment within the total range of the electrical adjustment.

4. The transmitter of claim 3 wherein the adjusted electrical output includes a zero setting of the transmitter output.

5. The transmitter of claim 3 wherein the adjusted electrical output includes a span setting of the transmitter output.

6. The transmitter of claim 5 wherein the adjusted electrical output further includes a zero setting of the transmitter output.

7. The transmitter of claim 3 wherein the adjusted electrical output includes a lower range value setting of the transmitter output.

8. The transmitter of claim 3 wherein the adjusted electrical output includes an upper range value setting of the transmitter output.

9. The transmitter of claim 8 wherein the adjusted electrical output further includes a lower range value setting of the transmitter output.

10. The transmitter of claim 3 wherein the time rate of change is a substantially fixed rate.

11. The transmitter of claim 3 wherein the time rate of change is a function of position of the manual adjustment in the coarse range.

12. The transmitter of claim 3 wherein the time rate of change is not fixed but changes as a function of a time interval during which the manual adjustment is left in the coarse range.

13. The transmitter of claim 12 wherein the time rate of change changes as a function of the time interval such that the adjusted electrical output changes exponentially as a function of time.

14. The transmitter of claim 3 wherein the circuit means has first and second parameters controlled noninteractively by the selection means.

15. The transmitter of claim 14 wherein the parameters are terms SPAN and SET4 in an equation controlling the transmitter output substantially according to the equation:

$$DACOUT = (NFN - SET4)2^{SHIFT} \times \frac{SPAN}{2^{SHIFT}} + MINVAL$$

where DACOUT represents the transmitter output; NFN represents a process variable; SET4 represents a zero setting; SPAN represents a span setting; SHIFT represents an exponent adjusted to keep calculated value of SPAN/$2^{shift}$ within a convenient calculation range; and MINVAL represents a transmitter output value at the last zero setting.

16. The transmitter of claim 3 wherein the transmitter includes resetting means for subtracting the transmitter output value from the stored value to compute a difference, the resetting means resetting the stored value to substantially the transmitter output value when the difference exceeds a predetermined discrepancy limit stored in the resetting means.

17. The transmitter of claim 3 wherein the transmitter includes re-ranging means for receiving digital inputs from an external source and adjusting the adjusted electrical output as a function of the received digital input.

18. The transmitter of claim 17 wherein the reranging means further control the circuit means to substitute a substitute process variable value for the sensed process variable.

19. The transmitter of claim 18 wherein the received digital input adjusts the adjustable electrical input while the substitute process variable is substituted in the circuit means to provide re-ranging without sensing reference values of an actual process variable.

20. The transmitter of claim 1 wherein the coarse range provides an adjusted electrical output which alternately increases and decreases automatically with time.

21. A transmitter controlling a transmitter output representing a process variable, the transmitter receiving manual adjustment of the transmitter output, comprising:
   adjustment means for providing an adjusted electrical output varying responsive to change of the received manual adjustment over a fine range of the manual adjustment and varying automatically as a function of time over a coarse range of the manual adjustment;
   storage means for storing the adjusted electrical output in nonvolatile memory as a stored value responsive to a received store command;
   selection means responding to a received manual selection for providing a selected output selected from the adjusted electrical output and the stored value, the selection means further providing the store command when the stored value is selected; and
   sensing means coupled to the process variable for controlling the transmitter output, the sensing means adjusting the transmitter output as a function of the adjusted electrical output when the selection means selects the adjusted electrical output, responding to change of the manual adjustment over the fine range and changing automatically as a function of time over the coarse range, and, the sensing means further providing the transmitter output substantially independent of changes to the manual adjustment when the selection means selects the stored value.

22. The transmitter of claim 21 wherein the coarse range includes a first portion where the adjusted electrical output increases automatically with time and a second portion, different than the first portion, where the adjusted output decreases automatically with time.

23. The transmitter of claim 22 wherein the sensing means provides a transmitter output limited to a transmitter output range and the fine range provides fine adjustment over a portion of the transmitter output range and the coarse range provides coarse placement of the fine adjustment within the total range of the electrical adjustment.

24. The transmitter of claim 23 wherein the adjusted electrical output includes a zero setting of the transmitter output.

25. The transmitter of claim 23 wherein the adjusted electrical output includes a span setting of the transmitter output.

26. The transmitter of claim 25 wherein the adjusted electrical output further includes a zero setting of the transmitter output.

27. The transmitter of claim 23 wherein the adjusted electrical output includes a lower range value setting of the transmitter output.

28. The transmitter of claim 23 wherein the adjusted electrical output includes an upper range value setting of the transmitter output.

29. The transmitter of claim 28 wherein the adjusted electrical output further includes a lower range value setting of the transmitter output.

30. The transmitter of claim 21 wherein the coarse range provides an adjusted electrical output which alternately increases and decreases automatically with time.

31. A transmitter, comprising:
   manual adjustment means which is manually controllable by an operator for providing both fine range and coarse range adjustments of an adjusted electrical output, the adjusted electrical output adjusting in response to manual inputs in the fine range and adjusting at a time rate of change automatically in the coarse range;
   storage means for storing the adjusted electrical output in nonvolatile memory as a stored value when a store command is received;
   selection means receiving manual selections from the operator, for selecting the adjusted electrical output after the operator activates a desired setting and for providing the store command and selecting the stored value after occurrence of a predetermined event; and
   circuit means sensing a process variable for controlling a transmitter output which represents the process variable and which has a parameter controlled by the selection such that the parameter can be adjusted coarsely and finely and made insensitive to adjustment by the storing.

32. The transmitter of claim 31 wherein a total range of adjustment includes a first portion selectable by the operator, where the adjusted electrical output increases automatically with time and a second portion selectable by the operator, where the adjusted electrical output decreases automatically with time.

33. The transmitter of claim 32 wherein the circuit means provides a transmitter output limited to a transmitter output range and the fine range provides fine adjustment over a portion of the transmitter output range and the coarse range provides coarse placement of the fine adjustment within the total range of adjustment.

34. The transmitter of claim 32 wherein the time rate of change changes as a function of a time interval during which the operator leaves the manual adjustment means in one of the two portions.

35. The transmitter of claim 34 wherein the time rate of change changes as a function of the time interval such that the adjusted electrical output changes exponentially as a function of time.

36. The transmitter according to claim 31 wherein the time rate of change is a function of position of the manual adjustment means.

37. The transmitter of claim 31 wherein the adjusted electrical output includes a zero setting of the transmitter output.

38. The transmitter of claim 31 wherein the adjusted electrical output includes a span setting of the transmitter output.

39. The transmitter of claim 31 wherein the coarse range provides an adjusted electrical output which alternately increases and decreases automatically with time.

40. The transmitter of claim 31 wherein the predetermined event occurs after the operator selects a store setting.

41. The transmitter of claim 31 wherein the predetermined event occurs after absence of manual selections and manual inputs for a predetermined time period.

* * * * *

UNITED STATES PATENT AND TRADEMARK OFFICE
CERTIFICATE OF CORRECTION

PATENT NO. : 5,253,511
DATED : October 19, 1993
INVENTOR(S) : Rafael Jaramillo et al.

It is certified that error appears in the above-indentified patent and that said Letters Patent is hereby corrected as shown below:

Col. 9, line 2 (claim 15, line 10)

cancel "value" and insert --values--.

Signed and Sealed this

Nineteenth Day of July, 1994

Attest:

BRUCE LEHMAN

Attesting Officer

Commissioner of Patents and Trademarks